United States Patent
Hagano et al.

(10) Patent No.: US 10,144,279 B2
(45) Date of Patent: Dec. 4, 2018

(54) CLOSING DEVICE FOR FILLER PORT

(71) Applicant: TOYODA GOSEI CO., LTD., Kiyosu-shi, Aichi-ken (JP)

(72) Inventors: Hiroyuki Hagano, Kiyosu (JP); Kazuya Watanabe, Kiyosu (JP); Naoki Mori, Kiyosu (JP); Go Oue, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/458,435

(22) Filed: Mar. 14, 2017

(65) Prior Publication Data

US 2017/0267096 A1    Sep. 21, 2017

(30) Foreign Application Priority Data

Mar. 17, 2016  (JP) .................. 2016-053579

(51) Int. Cl.
*B60K 15/04* (2006.01)
*B60K 15/05* (2006.01)
(Continued)

(52) U.S. Cl.
CPC .......... *B60K 15/0406* (2013.01); *B60K 15/05* (2013.01); *E05B 83/34* (2013.01);
(Continued)

(58) Field of Classification Search
CPC ............... B60K 15/04; B60K 15/05; B60K 2015/03552; B60K 2015/0429;
(Continued)

(56) References Cited

U.S. PATENT DOCUMENTS 7,762,291 B2 *  7/2010  Martin .................. B60K 15/04
                                                141/302
7,967,041 B2 *  6/2011  Groom .................. B60K 15/04
                                                141/350
(Continued)

FOREIGN PATENT DOCUMENTS

JP    2010-023678 A    2/2010
JP    2011-023678 A    2/2011
JP    2014-069618 A    4/2014

*Primary Examiner* — D Glenn Dayoan
*Assistant Examiner* — Sunsurraye Westbrook
(74) *Attorney, Agent, or Firm* — Posz Law Group, PLC

(57) ABSTRACT

There is provided a closing device for a filler port. This closing device for the filler port comprises a fuel passage forming portion configured to include a first engagement element; a first open-close mechanism configured to include a first cover that is opened toward an upstream side; and a second open-close mechanism configured to open and close a second opening and include a second cover that is opened toward the upstream side. The first open-close mechanism further comprises a disengagement portion located on the upstream side of a second engagement element when the second engagement element is engaged with the first engagement element, and configured to disengage the second engagement element from the first engagement element when receiving a force in a closing direction from the second cover.

11 Claims, 5 Drawing Sheets

(51) Int. Cl.
*E05B 83/34* (2014.01)
*E05C 19/02* (2006.01)

(52) U.S. Cl.
CPC .... *E05C 19/022* (2013.01); *B60K 2015/0445* (2013.01); *B60K 2015/053* (2013.01); *B60K 2015/0553* (2013.01)

(58) Field of Classification Search
CPC .... B60K 2015/0458; B60K 2015/0461; E05B 83/34; E05C 19/02
USPC .... 296/97.2, 97.1, 1.11, 211, 208, 214, 215, 296/223, 97.12; 359/601, 613, 23, 582, 359/603, 900; 428/138, 141, 156, 426, 428/42.1, 432
See application file for complete search history.

(56) References Cited

U.S. PATENT DOCUMENTS

| | | | | |
|---|---|---|---|---|
| 8,539,993 | B2* | 9/2013 | Hagano | B60K 15/04 |
| | | | | 141/302 |
| 8,863,792 | B2* | 10/2014 | Kataoka | B60K 15/04 |
| | | | | 141/350 |
| 9,221,333 | B2* | 12/2015 | Hagano | B60K 15/04 |
| 9,434,248 | B2* | 9/2016 | Hagano | B60K 15/05 |
| 2010/0012223 | A1* | 1/2010 | Yoshida | B60K 15/0406 |
| | | | | 141/350 |
| 2014/0084005 | A1* | 3/2014 | Kito | B29C 45/1657 |
| | | | | 220/304 |
| 2014/0091095 | A1 | 4/2014 | Hagano et al. | |

\* cited by examiner

CLOSING DEVICE FOR FILLER PORT

CROSS-REFERENCE TO RELATED APPLICATIONS

The present application claims priority from Japanese patent application 2016-053579 filed on Mar. 17, 2016, the content of which is hereby incorporated by reference into this application.

BACKGROUND

Field

The disclosure relates to technology regarding a closing device for a filler port.

Related Art

A closing device is provided in a filler port of a motor vehicle to close the filler port such as to prevent the overflow of a liquid fuel stored in a fuel tank from a fuel passage. The closing device for the filler port includes a lid serving as an outer cover configured to separate the fuel tank from outside, and a filler neck placed inside of the lid and configured to receive insertion of a fueling nozzle for supplying the liquid fuel. JP 2014-69618A describes an open-close member for a fuel passage that is rotated toward the fuel tank side to be opened by insertion of the fueling nozzle.

In an open-close device for a fuel tank described in JP 2014-69618A, when the fueling nozzle is inserted, the open-close member is rotated toward the fuel passage side so as to open an opening of the fuel passage. There is accordingly a possibility that mud or the like adhering to a surface of the open-close member enters the fuel passage.

SUMMARY

According to one aspect of the disclosure, there is provided a closing device for a filler port. This closing device for the filler port comprises a fuel passage forming portion configured to include a first engagement element and to form a fuel passage through which a liquid fuel supplied passes, a first open-close mechanism configured to open and close a first opening provided on an upstream side of the fuel passage and to include a first cover that is configured to be opened toward the upstream side; an inlet box formed in a box-like structure, configured to form a second opening on the upstream side and arranged on the upstream side of the fuel passage forming portion; and a second open-close mechanism configured to open and close the second opening and include a second cover that is configured to be opened toward the upstream side. The first open-close mechanism further comprises a second engagement element configured to engage with the first engagement element and hold the first cover in a closed position; and a disengagement portion located on the upstream side of the second engagement element when the second engagement element is engaged with the first engagement element, and configured to disengage the second engagement element from the first engagement element when receiving a force in a closing direction from the second cover.

In the closing device for the filler port according to any of the above aspects, even when mud or the like adheres to an upstream-side outer surface of the first cover, for example, during fueling, the configuration of the first cover that is opened toward the upstream side reduces the possibility that the mud adhering to the outer surface of the first cover enters the fuel passage.

DETAILED DESCRIPTION

A. Embodiment (1) Schematic Configuration of Closing Device for Filler Port

Figure 1:
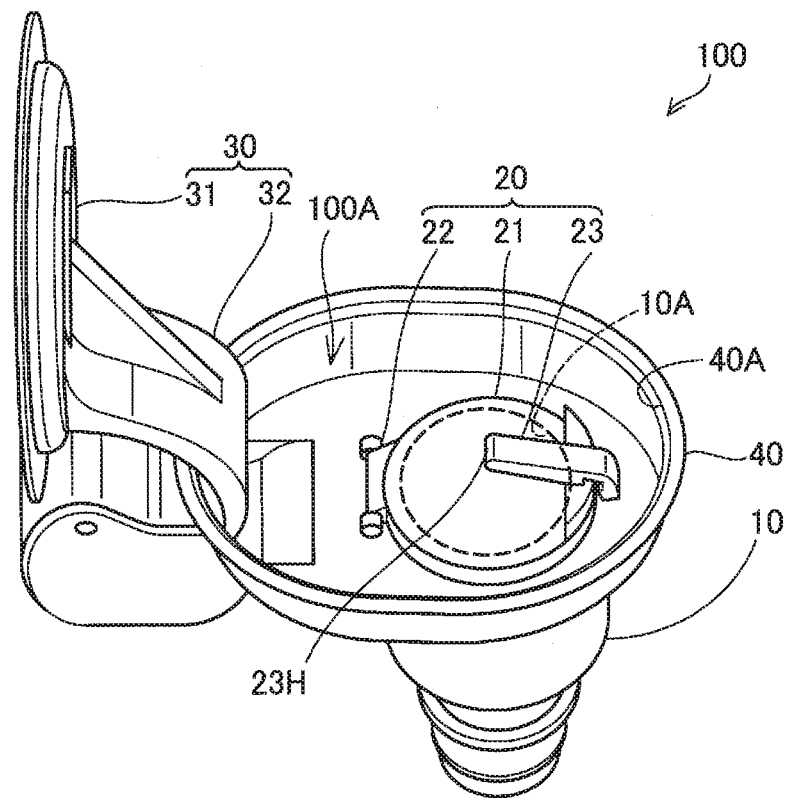
FIG. 1 is a perspective view illustrating a second open-close mechanism in an open position of a closing device for a filler port according to an embodiment.

FIG. 1 is a perspective view illustrating a second open-close mechanism 30 in an open position of a closing device 100 for a filler port 100A according to an embodiment. The closing device 100 for the filler port 100A (hereinafter may be simply called "closing device 100") is mounted on a motor vehicle. A fueling nozzle provided to supply a liquid fuel to a fuel tank of the motor vehicle is inserted into the closing device 100. As illustrated in FIG. 1, the closing device 100 may include a fuel passage forming portion 10, a first open-close mechanism 20, a second open-close mechanism 30 and an inlet box 40. The fuel passage forming portion 10 is a tubular member provided to form a first opening 10A configured to receive insertion of the fueling nozzle and form a fuel passage configured to introduce the liquid fuel to the fuel tank.

The inlet box 40 is configured to position the fuel passage forming portion 10 relative to the motor vehicle. As illustrated in FIG. 1, the inlet box 40 is formed in a box-like structure having an elliptical cross section that is perpendicular to a direction of insertion of the fueling nozzle. The inlet box 40 is connected with the fuel tank of the motor vehicle via the fuel passage forming portion 10. The fuel passage forming portion 10 is connected with the fuel tank at an end on an opposite side that is opposite to a side where the first opening 10A is formed. The inlet box 40 includes a second opening 40A formed on an opposite side that is opposite to the side where the fuel passage forming portion 10 is connected with the fuel tank. In the description hereof the fuel tank side is called downstream side. The upstream side in the description hereof denotes filler port 100A-side viewed from the fuel tank side, with regard to the fuel tank side of the first opening 10A. The upstream side in the description hereof also denotes opposite face side of a first cover 21 that is opposite to a face opposed to the first opening 10A and opposite face side of a second cover 31 that is opposite to a face opposed to the second opening 40A, with regard to the first open-close mechanism 20-side and the second open-close mechanism 30-side of the first opening 101. In other words, in the description hereof, with regard to the first open-close mechanism 20-side of the first opening 10A, in a closed position of the first open-close mechanism 20, the lower side of FIG. 1 viewed from the first open-close mechanism 20 is called downstream side, and the upper side of FIG. 1 viewed from the first open-close mechanism 20 is called upstream side. In an open position of the first open-close mechanism 20, the right side of FIG. 1 viewed from the first open-close mechanism 20 is called downstream side, and the left side of FIG. 1 viewed from the first open-close mechanism 20 is called upstream side. In the description hereof, with regard to the second open-close mechanism 30-side of the first open-close mechanism 20, like the first open-close mechanism 20-side, in a closed position of the second open-close mechanism 30, the lower side of FIG. 1 viewed from the second open-close mechanism 30 is called downstream side, and the upper side of FIG. 1 viewed from the second open-close mechanism 30 is called upstream side. In an open position of the second open-close mechanism 30, the right side of FIG. 1 viewed from the second open-close mechanism 30 is called downstream side, and the left side of FIG. 1 viewed from the second open-close mechanism 30 is called upstream side. A direction corresponding to the upstream side is called upstream direction, and a direction corresponding to the downstream side is called downstream direction.

The first open-close mechanism 20 is configured to open and close the first opening 10A. The first open-close mechanism 20 may include a first cover 21, a first pressing portion 22 and an engagement mechanism 23. In the description hereof, a first support end is also called the first pressing portion 22. The first cover 21 is a resin cover configured to rotate about the first pressing portion 22 as a fixed end and thereby open and close the first opening 10A. The first cover 21 is rotated toward the upstream side to be opened from a closed position of the first opening 10A shown in FIG. 1. The first pressing portion 22 includes a torsion spring configured to press the first cover 21 in an opening direction. The engagement mechanism 23 is a rod-like member configured to come into contact with the second open-close mechanism 30 in the closed position of the second open-close mechanism 30. The engagement mechanism 23 is fixed in a rotatable manner to a free end of the first cover 21 that is on an opposite side to the first pressing portion 22 as the fixed end. The engagement mechanism 23 has one end 23H that is a part extended in a direction approaching the upstream side and the first pressing portion 22-side. The other end of the engagement mechanism 23 is configured to be engage with a first engagement element 12L formed in the fuel passage forming portion 10 as described later in detail. One end 23H that is the extended part of the engagement mechanism 23 comes into contact with part of the second open-close mechanism 30, in response to a closing degree of the second open-close mechanism 30. This controls engagement of the other end of the engagement mechanism 23 with the first engagement element 12L. In the description below, with regard to the first open-close mechanism 20 and the second open-close mechanism 30, the direction of rotating and opening is called opening direction, and the direction of closing is called closing direction.

The second open-close mechanism 30 is a lid configured to protect the fuel passage forming portion 10 and the first open-close mechanism 20 in the closed position. The second open-close mechanism 30 may include a second cover 31 and a second pressing portion 32. In the description hereof, a second support end is also called the second pressing portion 32. The second cover 31 is configured to rotate with the motion of the second pressing portion 32 and separate the filler port 10A from the atmosphere in its closed position. The second cover 31 is formed in an elliptical shape to be fit in the second opening 40A in the closed position. The second cover 31 includes an elastic member provided on a downstream side face to absorb a variation in position where the second cover 31 is fit in the second opening 40A. The second pressing portion 32 is configured as a curved arm to rotate the second cover 31 and includes a torsion spring configured to press the second cover 31 in a closing direction. The second pressing portion 32 is arranged in the same direction as the first pressing portion 22 relative to the center of the first opening 10A as the basis. The second cover 31 is accordingly rotated in the same direction as the first cover 21.

Figure 2:
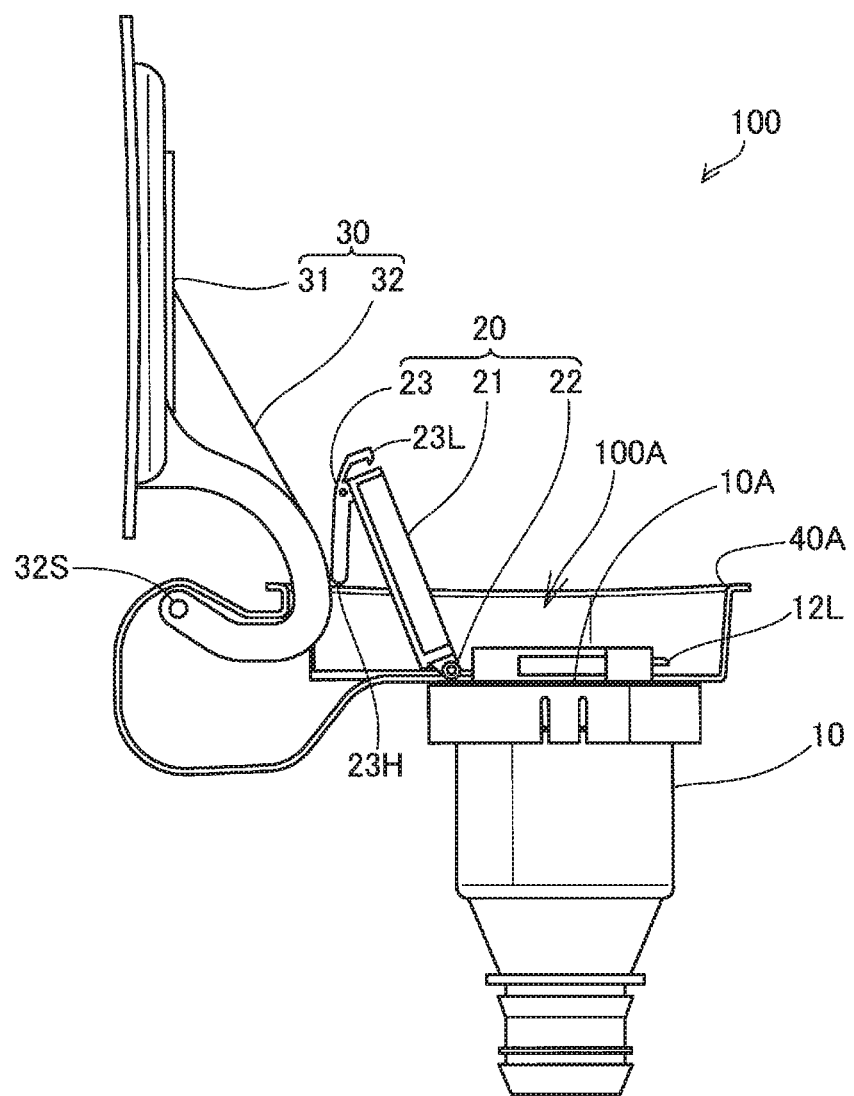
FIG. 2 is a sectional view illustrating the closing device for the filler port in an open position of a first cover and a second cover.

FIG. 2 is a sectional view illustrating the closing device 100 for the filler port 100A in an open position of the first cover 21 and the second cover 31. As illustrated in FIG. 2, the second cover 31 is configured to rotate in the same direction as the first cover 21 (counterclockwise in FIG. 2) about a fixed end 32S of the second pressing portion 32. The rotatable range of the second cover 31 is 90 degrees. As illustrated in FIG. 2, the first cover 21 is configured such that one end 23H of the engagement mechanism 23 comes into contact with part of the second pressing portion 32 in its full-open position. This restricts further rotation of the first cover 21. The engagement mechanism 23 includes a second engagement element 23L formed at the opposite end that is opposite to one end 23H at which the engagement mechanism 23 comes into contact with the second pressing portion 32. The second engagement element 23L is formed in a claw-like shape curved toward one end 23H. The fuel passage forming portion 10 includes the first engagement element 12L formed on an outer circumference of the first opening 10A. The first engagement element 12L is a projection protruded in a radial direction from an outer circumferential face of the fuel passage forming portion 10. The first engagement element 12L is engaged with the second engagement element 23L in a closed position of the first cover 21. One end 23H of the engagement mechanism 23 corresponds to the disengagement portion described in SUMMARY.

(2) Details of Operations in Opening and Closing of First Open-Close Mechanism 20

Figure 3:
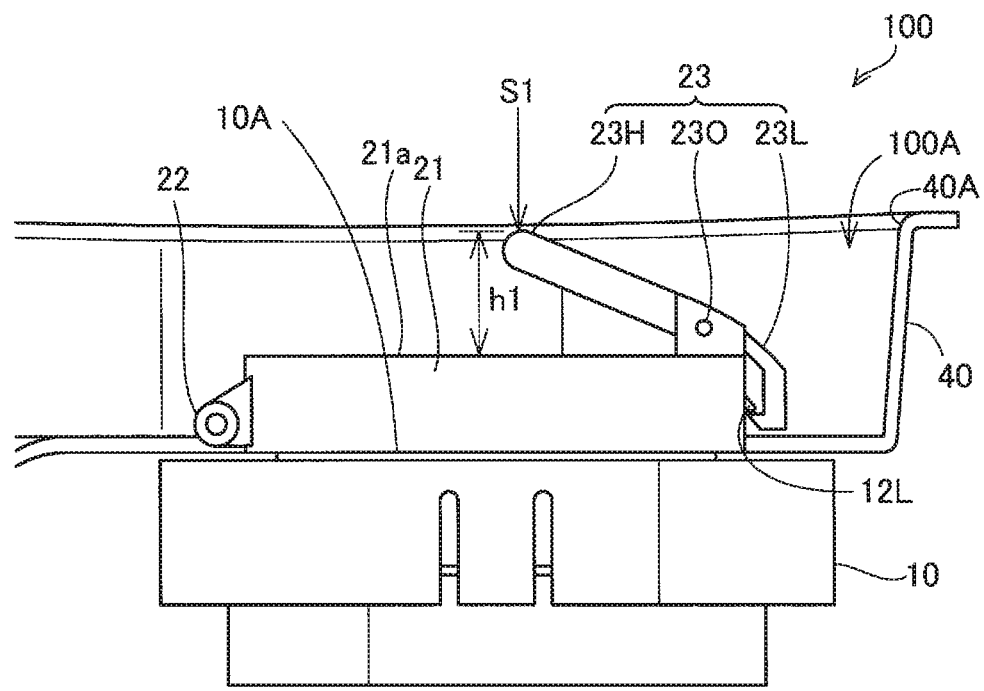
FIG. 3 is an enlarged sectional view illustrating the periphery of a first open-close mechanism in a closed position of the first cover to close a first opening.

FIG. 3 is an enlarged sectional view illustrating the periphery of the first open-close mechanism 20 in the closed position of the first cover 21 to close the first opening 10A. The engagement mechanism 23 is rotated relative to the first cover 21 about a support shaft 23O located on the upstream side (upper side in FIG. 3) of the free end of the first cover 21. The support shaft 23O is a torsion spring configured to press the engagement mechanism 23 clockwise in FIG. 3. In other words, the support shaft 23O presses the engagement mechanism 23 in a direction to engage the second engagement element 23L with the first engagement element 12L in the closed position of the first cover 21. According to this embodiment, the pressing force of the support shaft 23O is set to be smaller than the pressing force of the first pressing portion 22. As illustrated in FIG. 3, the second engagement element 23L is engaged with the first engagement element 12L when no force S1 is applied to one end 23H of the engagement mechanism 23 in the downstream direction, in the closed position of the first cover 21. Accordingly even when the first pressing portion 22 presses the first cover 21 in its opening direction, rotation of the first cover 21 is restricted by the first engagement element 12L. In other words, when the second engagement element 23L is engaged with the first engagement element 12L, the first cover 21 closes the first opening 10A. When the second engagement element 23L is engaged with the first engagement element 12L, a distance from an upstream-side face 21a of the first cover 21 to an upstream-side edge of one end 23H of the engagement mechanism 23 is equal to a distance h1.

Figure 4:
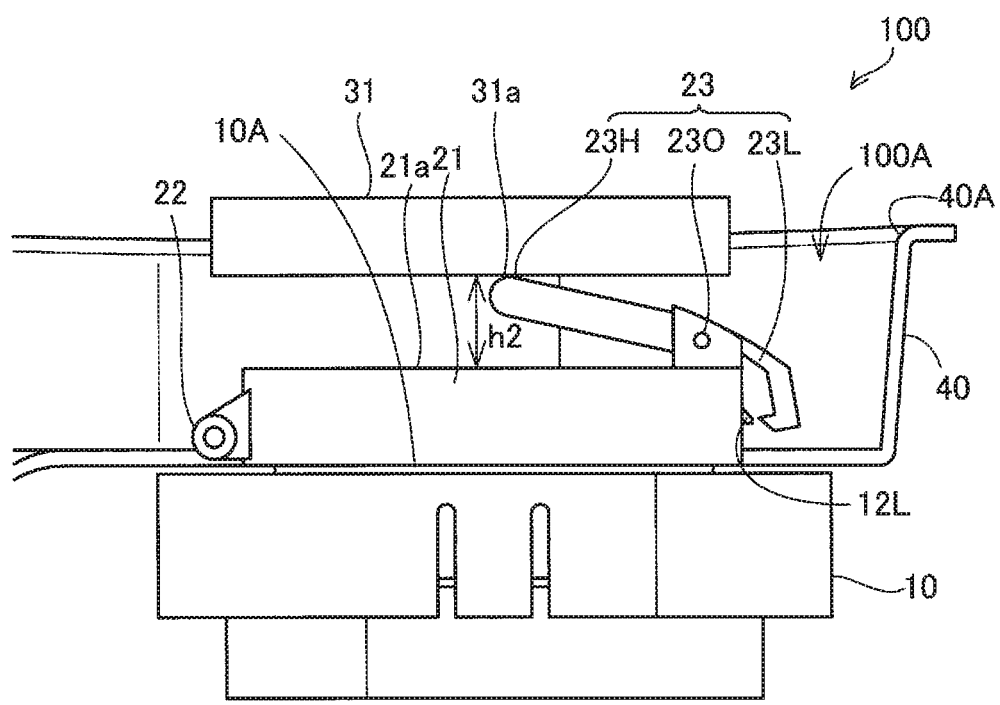
FIG. 4 is an enlarged sectional view illustrating the periphery of the first open-close mechanism in a closed position of the second cover to close a second opening.

FIG. 4 is an enlarged sectional view illustrating the periphery of the first open-close mechanism 20 in the closed position of the second cover 31 to close the second opening 40A. For the purpose of better understanding, the second pressing portion 32 and the fixed end 32S are omitted from the illustration of FIG. 4. As illustrated in FIG. 4, when the second cover 31 is closed, part 31a of a downstream-side face of the second cover 31 comes into contact with one end 23H of the engagement mechanism 23. When the engagement mechanism 23 comes into contact with the second cover 31 and is pressed in the downstream direction, this changes the distance from the upstream-side face 21a of the first cover 21 to the upstream-side edge of one end 23H of the engagement mechanism 23 to a distance h2 (<distance h1). In this state, the engagement mechanism 23 is rotated about the support shaft 23O that is an axis parallel to the first pressing portion 22, in a direction to disengage the second engagement element 23L from the first engagement element 12L (counterclockwise in FIG. 4). The counterclockwise rotation of the engagement mechanism 23 disengages the second engagement element 23L that has been engaged with the first engagement element 12L. Even when the second engagement element 23L is disengaged from the first engagement element 12L, since the engagement mechanism 23 is in contact with the second cover 31 and is pressed in the downstream direction, the first cover 21 keeps closing the first opening 10A. In other words, in the illustrated state of FIG. 4, the first cover 21 closes the first opening 10A not by engagement of the second engagement element 23L with the first engagement element 12L but by pressing of the engagement mechanism 23 in the downstream direction by the second cover 31.

Figure 5:
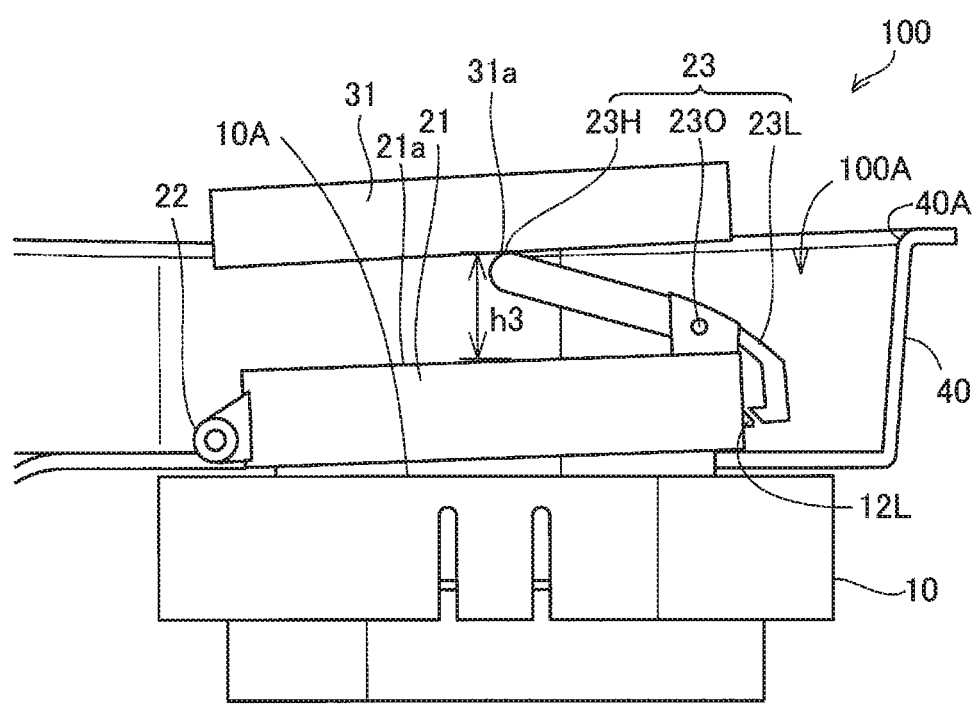
FIG. 5 is an enlarged sectional view illustrating the periphery of the first open-close mechanism when the first cover and the second cover start opening.

FIG. 5 is an enlarged sectional view illustrating the periphery of the first open-close mechanism 20 when the first cover 21 and the second cover 31 start opening. As illustrated in FIG. 5, when the second cover 31 is slightly opened from the closed position (FIG. 5 illustrates the state that the second cover 31 is opened by 2 degrees from its closed position to close the second opening 40A), the contact position where one end 23H of the engagement mechanism 23 is in contact with the second cover 31 is slightly moved in the upstream direction. This changes the distance from the upstream-side face 21a of the first cover 21 to the upstream-side edge of one end 23H of the engagement mechanism 23 to a distance h3 (>distance h2). The second engagement element 23L is rotated about the support shaft 23O in a direction to engage with the first engagement element 12L. According to this embodiment, however, the second engagement element 23L is arranged in such a positional relationship as not to engage with the first engagement element 12L when the second cover 31 starts opening. Accordingly, as the second cover 31 is changed from the closed position toward the open position, the first cover 21 is also changed toward the open position.

(3) Functions and Advantageous Effects in Opening and Closing of First Open-Close Mechanism 20

In the closed position of the second cover 31, for example, during a run of the motor vehicle, as illustrated in FIG. 4, the first cover 21 closes the first opening 10A, and the second engagement element 23L is not engaged with the first engagement element 12L. When the second cover 31 is opened from the closed position, as illustrated in FIG. 2, the first cover 21 is opened simultaneously with the second cover 31, and the filler port 100A is changed to be ready for insertion of the fueling nozzle.

When the second cover 31 is closed from the open position of the second cover 31 and the first cover 21 shown in FIG. 2, since one end 23H of the engagement mechanism 23 is in contact with part of the second pressing portion 32, the first open-close mechanism 20 receives a force of rotating the first opening 10A in its closing direction via one end 23H of the engagement mechanism 23. Accordingly, when the second cover 31 is fully closed, the first cover 21 rotates about the first pressing portion 22 to close the first opening 10A and thereby close the filler port 100A.

As described above, the first cover 21 is opened and closed accompanied with opening and closing of the second cover 31. The first cover 21 is, however, configured to be manually opened and closed alone using a driver or the like, irrespective of opening and closing of the second cover 31. For example, in the case of high-pressure washing of the motor vehicle in the open position of the second cover 31, engagement of the second engagement element 23L with the first engagement element 12L as shown in FIG. 3 enables the first opening 10A to be closed by closing only the first cover 21 while the second cover 31 is kept open.

As described above, in the closing device 100 for the filler port 100A according to the embodiment, the first open-close mechanism 20 includes the first cover 21 configured to be rotated and opened toward the upstream side and thereby open and close the first opening 10A, and the second engagement element 23L configured to be engaged with the first engagement element 12L. Engagement of the second engagement element 23L with the first engagement element 12L causes the first cover 21 to close the first opening 10A. When receiving the force in the downstream direction by the second cover 31, the engagement mechanism 23 disengages the second engagement element 23L from the first engagement element 12L. In the closing device 100 for the filler port 100A according to the embodiment, even when mud or the like adheres to an upstream-side outer surface of the first cover 21, for example, during fueling, the configuration of the first cover 21 that is rotated and opened toward the upstream side reduces the possibility that the mud adhering to the outer surface of the first cover 21 enters the fuel passage. In the closing device 100 for the filler port 100A according to the embodiment, the first cover 21 is opened toward the upstream side. Compared with a configuration of the first cover 21 that is opened toward the downstream side, this configuration does not need a space for placing the first cover 21 opened toward the downstream side and thereby allows for downsizing of the fuel passage forming portion 10. In the closing device 100 for the filler port 100A according to the embodiment, the first cover 21 is opened and closed accompanied with opening and closing of the second cover 31. This configuration does not require the user who performs fueling to open and close the second cover 31 and the first cover 21 separately but enables the user who performs fueling to open and close the first cover 21 simultaneously by opening and closing only the second cover 31. This improves the convenience of the user who performs fueling.

In the closing device 100 for the filler port 100A according to the embodiment, the second cover 31 is rotated in the same direction as the first cover 21 (for example, counterclockwise in FIG. 2) to be opened and closed. The second engagement element 23L is provided at the free end of the first open-close mechanism 20 on the opposite side to the first pressing portion 22. The closing device 100 for the filler port 100A according to the embodiment employs the simple mechanism to open and close the first cover 21 accompanied with opening and closing of the second cover 31.

B. Modifications

The disclosure is not limited to the above embodiment but may be implemented by any of various other aspects without departing from the scope of the disclosure. Some of possible modifications are given below.

According to the above embodiment, the closing device 100 for the filler port 100A is configured to include the second open-close mechanism 30. The configuration of the closing device 100 may however, be modified and changed in any of various ways. For example, the closing device 100 may be configured to exclude the second open-close mechanism 30. According to a modification, in a closing device 100a for the filler port 100A configured to include the first open-close mechanism 20 and the fuel passage forming portion 10, the second cover 31 of the second open-close mechanism 30 may be replaced with a member configured to come into contact with one end 23H of the engagement mechanism 23 and control disengagement of the second engagement element 23L from the first engagement element 12L. This modified configuration also suppresses the mud or the like adhering to the outer circumferential face of the first cover 21 from entering the fuel passage.

According to the above embodiment, as shown in FIGS. 3 and 4, the second engagement element 23L formed in the claw-like shape is engaged with the first engagement element 12L protruded in the radial direction. The configuration of engaging the second engagement element 23L with the first engagement element 12L may, however, be modified and changed in any of various ways. For example, the first engagement element 12L may be formed as a recess in part of the fuel passage forming portion 10 that forms the outer circumferential face of the first opening 10A, and the second engagement element 23L in the claw-like shape may be fit in the recess.

According to the above embodiment, in the closed position of the second cover 31 of the second open-close mechanism 30, part of the downstream side face of the second cover 31 comes into contact with one end 23H of the engagement mechanism 23 and is pressed in the downstream direction. This controls the degree of rotation of the first cover 21 and thereby controls the engagement of the second engagement element 23L with the first engagement element 12L. The configuration of controlling the engagement may, however, be modified and changed in any of various ways. For example, the engagement mechanism 23 may be configured to exclude one end 23H extended toward the upstream side and may be formed in a flat plate-like structure to come into contact with a protrusion formed on the second cover 31 and thereby control the engagement of the second engagement element 23L with the first engagement element 12L.

According to the above embodiment, the filler port 100A is defined as the space formed by the inlet box 40 and the second open-close mechanism 30. The definition of the filler port 100A may, however, be changed in any of various ways. For example, the first opening 10A may be defined as a filler port.

The disclosure is not limited to any of the embodiment and its modifications described above but may be implemented by a diversity of configurations without departing from the scope of the disclosure. For example, the technical features of any of the above embodiments and their modifications may be replaced or combined appropriately in order to solve part or all of the problems described above or in order to achieve part or all of the advantageous effects described above. Any of the technical features may be omitted appropriately unless the technical feature is described as essential in the description hereof. The present disclosure may be implemented by aspects described below.

According to one aspect of the disclosure, there is provided a closing device for a filler port. This closing device for the filler port comprises a fuel passage forming portion configured to include a first engagement element and to form a fuel passage through which a liquid fuel supplied passes; a first open-close mechanism configured to open and close a first opening provided on an upstream side of the fuel passage and to include a first cover that is configured to be opened toward the upstream side; an inlet box formed in a box-like structure, configured to form a second opening on the upstream side and arranged on the upstream side of the fuel passage forming portion; and a second open-close mechanism configured to open and close the second opening and include a second cover that is configured to be opened toward the upstream side. The first open-close mechanism further comprises a second engagement element configured to engage with the first engagement element and hold the first cover in a closed position; and a disengagement portion located on the upstream side of the second engagement element when the second engagement element is engaged with the first engagement element, and configured to disengage the second engagement element from the first engagement element when receiving a force in a closing direction from the second cover. In the closing device for the filler port of this aspect, even when mud or the like adheres to an upstream-side outer surface of the first cover, for example, during fueling, the configuration of the first cover that is opened toward the upstream side reduces the possibility that the mud adhering to the outer surface of the first cover enters the fuel passage. This configuration does not require the user who performs fueling to open and close the second cover and the first cover separately but enables the user who performs fueling to open and close the first cover simultaneously by opening and closing only the second cover. This improves the convenience of the user who performs fueling.

In the closing device for the filler port of the above aspect, the first open-close mechanism may include a first pressing portion configured to press the first cover in an opening direction, and the first cover may be rotated about the first pressing portion to be opened and closed. The second open-close mechanism may include a second pressing portion configured to press the second cover in a closing direction, and the second cover may be rotated about the second pressing portion in an identical direction with the first cover to be opened and closed. The second engagement element may be formed integrally with the disengagement portion at a free end of the first open-close mechanism. The first open-close mechanism may include a support shaft that is fixed to the first cover and is provided as an axis parallel to the first pressing portion. The support shaft may be configured to press the disengagement portion and the second engagement element about the support shaft in a direction to engage the second engagement element with the first engagement element. The closing device for the filler port of this aspect employs the simple mechanism to open and close the first cover accompanied with opening and closing of the second cover.

The disclosure may be implemented by any of various aspects other than the closing device for the filler port, for example, a motor vehicle equipped with the closing device for the filler port or a method of manufacturing the closing device for the filler port.

What is claimed is:

1. A closing device for a filler port, comprising:
a fuel passage forming portion configured to include a first engagement element and to form a fuel passage through which a liquid fuel supplied passes,
a first open-close mechanism configured to open and close a first opening provided on an upstream side of the fuel passage and to include a first cover that is configured to be opened toward the upstream side;
an inlet box formed in a box-like structure, configured to form a second opening on the upstream side and arranged on the upstream side of the fuel passage forming portion; and
a second open-close mechanism configured to open and close the second opening and to include a second cover that is configured to be opened toward the upstream side, wherein
the first open-close mechanism further comprises:
a second engagement element configured to engage with the first engagement element and hold the first cover in a closed position; and
a disengagement portion located on the upstream side of the second engagement element when the second engagement element is engaged with the first engagement element, and
the disengagement portion configured to disengage the second engagement element from the first engagement element when receiving a force in a closing direction from the second cover by the disengagement portion being contacted with the second cover.

2. The closing device according to claim 1, wherein the first open-close mechanism includes a first support end configured to press the first cover in an opening direction, wherein
the first cover is rotated about the first support end to be opened and closed,
the second open-close mechanism includes a second support end configured to press the second cover in a closing direction, wherein
the second cover is rotated about the second support end in an identical direction with the first cover to be opened and closed,
the second engagement element is formed integrally with the disengagement portion at a free end of the first open-close mechanism,
the first open-close mechanism includes a support shaft that is fixed to the first cover and is provided as an axis parallel to the first support end,
the support shaft is configured to press the disengagement portion and the second engagement element about the support shaft in a rotating direction to engage the second engagement element with the first engagement element, and
when the disengagement portion receives the force in the closing direction from the second cover, the disengagement portion and the second engagement element are rotated about the support shaft in an opposite direction that is opposite to the pressing direction of the support shaft, such as to disengage the second engagement element from the first engagement element.

3. A closing device used for a closing system of a filler port, the closing system includes an inlet box and a second open-close mechanism, the inlet box is formed in a box-like structure and is configured to form a second opening, the second open-close mechanism is configured to open and close the second opening and to include a second cover, the second cover is configured to be opened toward an upstream side of the inlet box, the closing device comprising:
a fuel passage forming portion configured to include a first engagement element and to form a fuel passage through which a liquid fuel supplied passes; and
a first open-close mechanism configured to open and close a first opening provided on an upstream side of the fuel passage and to include a first cover that is configured to be opened toward the upstream side, wherein the first open-close mechanism further comprises:
a second engagement element configured to engage with the first engagement element and hold the first cover in a closed position; and
a disengagement portion located on the upstream side of the second engagement element when the second engagement element is engaged with the first engagement element, and
the disengagement portion configured to disengage the second engagement element from the first engagement element when receiving a force in a closing direction from the second cover by the disengagement portion being contacted with the second cover.

4. The closing device according to claim 2, wherein the second engagement element is provided at an opposite end that is on an opposite side to the disengagement portion.

5. The closing device according to claim 4, wherein the second cover includes an elastic member provided on a downstream side face.

6. The closing device according to claim 1, wherein the second engagement element is provided at an opposite end that is on an opposite side to the disengagement portion.

7. The closing device according to claim 1, wherein the second cover includes an elastic member provided on a downstream side face.

8. A closing device for a filler port, comprising:
a fuel passage forming portion configured to include a first engagement element and to form a fuel passage through which a liquid fuel supplied passes;
a first open-close mechanism configured to open and close a first opening provided on an upstream side of the fuel passage and to include a first cover that is configured to be opened toward the upstream side;
an inlet box formed in a box-like structure, configured to form a second opening on the upstream side and arranged on the upstream side of the fuel passage forming portion; and
a second open-close mechanism configured to open and close the second opening and to include a second cover that is configured to be opened toward the upstream side, wherein
the first open-close mechanism further comprises:
a second engagement element configured to engage with the first engagement element and hold the first cover in a closed position; and
a disengagement portion located on the upstream side of the second engagement element when the second engagement element is engaged with the first engagement element, and
the disengagement portion configured to disengage the second engagement element from the first engagement element when receiving a force in a closing direction from the second cover, the first open-close mechanism includes a first support end configured to press the first cover in an opening direction, wherein the first cover is rotated about the first support end to be opened and closed, the second open-close mechanism includes a second support end configured to press the second cover in a closing direction, wherein the second cover is rotated about the second support end in an identical direction with the first cover to be opened and closed, the second engagement element is formed integrally with the disengagement portion at a free end of the first open-close mechanism, the first open-close mechanism includes a support shaft that is fixed to the first cover and is provided as an axis parallel to the first support end;

the support shaft is configured to press the disengagement portion and the second engagement element about the support shaft in a rotating direction to engage the second engagement element with the first engagement element, and when the disengagement portion receives the force in the closing direction from the second cover, the disengagement portion and the second engagement element are rotated about the support shaft in an opposite direction that is opposite to the pressing direction of the support shaft, such as to disengage the second engagement element from the first engagement element.

9. The closing device according to claim 8, wherein the second engagement element is provided at an opposite end that is on an opposite side to the disengagement portion.

10. The closing device according to claim 9, wherein the second cover includes an elastic member provided on a downstream side face.

11. The closing device according to claim 8, wherein the second cover includes an elastic member provided on a downstream side face.

* * * * *